Sept. 16, 1941.    H. FORSYTH    2,256,259
POULTRY ROOST
Filed Dec. 9, 1940
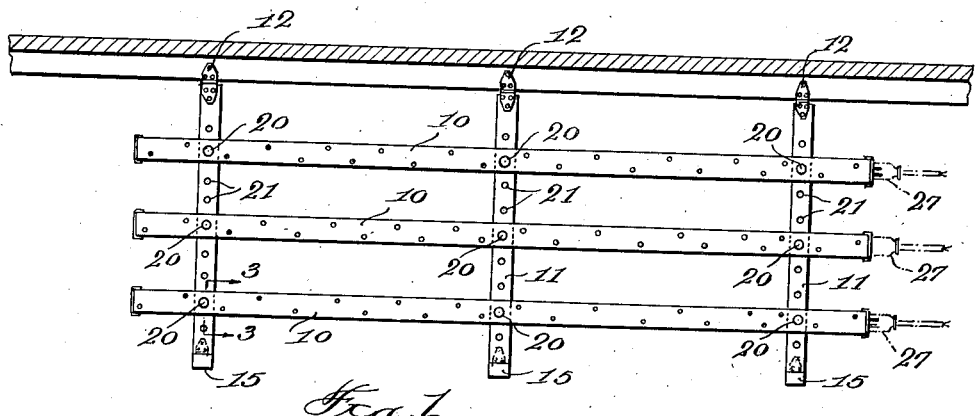
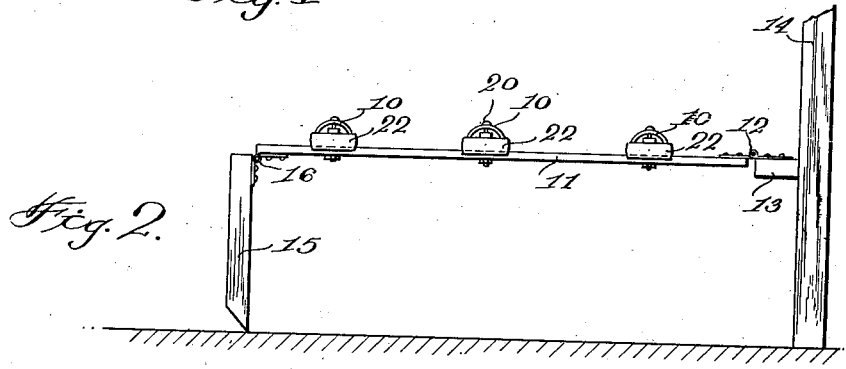
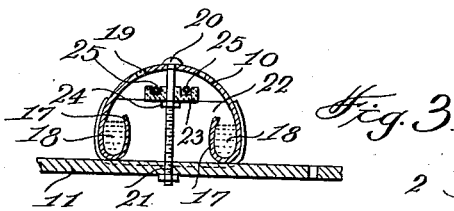
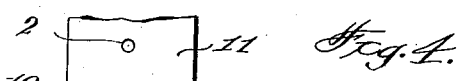
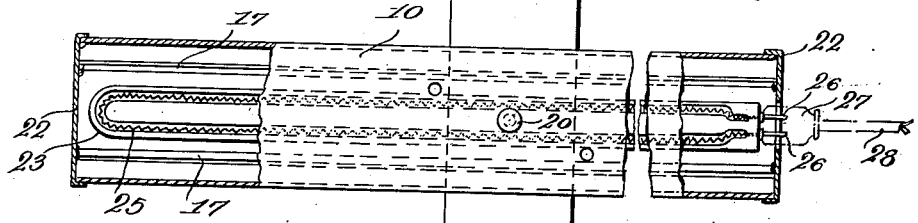
Harry Forsyth
INVENTOR
BY Victor J. Evans & Co.
ATTORNEYS
WITNESS Patented Sept. 16, 1941

2,256,259

UNITED STATES PATENT OFFICE 2,256,259

POULTRY ROOST

Harry Forsyth, Prosser, Wash.

Application December 9, 1940, Serial No. 369,309

2 Claims. (Cl. 119—25)

This invention relates to poultry roosts and has for an object to provide a metal roost having spaced longitudinal channels for the reception of an insecticide, the roost being arched between the channels and perforated to permit escape of the insecticide or fumes therefrom to permeate the space above the roost.

A further object is to provide a roost including cross bars to which the longitudinal roost bars are adjustably secured to accommodate various sizes of poultry.

A further object is to provide a roost having electric heating elements for warming the roost and in some instances for evaporating a liquid insecticide.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a plan view of a poultry roost constructed in accordance with the invention.

Figure 2 is an end elevation of the roost.

Figure 3 is a detail cross sectional view taken on the line 3—3 of Figure 1.

Figure 4 is a plan view of one of the roost bars, with portions broken away.

Referring now to the drawing in which like characters of reference designate similar parts in the various views, 10 designates a plurality of roost bars connected at intervals by cross bars 11, which latter are hinged, as shown at 12, to a supporting bar 13 secured to a wall 14 of the poultry pen at a predetermined height above the floor. Props 15, equal in number to the number of cross bars 11 are hingedly connected at the upper ends to the cross bars, as shown at 16. The props are of sufficient height to hold the cross bars 11 horizontal.

Each roost bar 10 is formed from an arched metal shell having the lower longitudinal edge portion turned inwardly and upwardly to provide channels or troughs 17, best shown in Figure 3, for the reception of insecticide 18, which may be either liquid or powder. The shell is provided with perforations 19 to permit the insecticide or fumes therefrom to permeate the space above the roost bar. Bolts 20 are passed vertically through the roost bar and are interchangeably received in openings 21 formed in the cross bars 11 so that the roost bars may be spaced near together or far apart to accommodate poultry of various sizes. The ends of the roost bars are closed by flanged caps 22, which retain the insecticide in the channels or troughs 17.

A bar 23 of insulating material is supported longitudinally within each roost bar by nuts 24 threaded on to the bolts 20. A pair of electrical resistance elements 25 are disposed in channels longitudinally of the bar. The ends of the elements are connected to prongs 26, which are received in sockets of a plug connector 27 which is connected by a cable 28 to any suitable source of electricity. The heating elements warm the air inside of the arched roost bars 10 and the warm air escapes through the perforations 19 to prevent poultry being chilled in cool climates. Also, in some instances where liquid insecticide is used, the warm air inside of the roost bar accelerates evaporation so that fumes will rise through the perforations 19 and permeate the feathers of the poultry.

Preferably all of the parts are formed of metal with the exception of the insulated bar 23 so that scalding water or even fire may be used to keep the parts in a sanitary condition at all times.

From the above description it is thought that the construction and operation of the invention will be fully understood without further explanation.

What is claimed is:

1. In a poultry roost, an insecticide bar formed from an arched metal shell having the lower longitudinal edge portions turned inwardly and upwardly to provide insecticide troughs, said shell being provided with perforations to permit the insecticide or fumes therefrom to permeate the space above the insecticide bar, and flanged caps closing the ends of the insecticide bar and retaining the insecticide in the troughs.

2. In a heated poultry roost, a roost bar formed from an arched perforated metal shell having the lower longitudinal edge portions turned inwardly and upwardly to provide insecticide troughs, securing bolts passed through the shell, an insulating bar secured to the securing bolts within the shell, heating elements disposed on the insulating bar, and means for securing the heating elements to a source of electricity.

HARRY FORSYTH.